E. A. SCHREIBER.
FLEXIBLE PIPE CONNECTION.
APPLICATION FILED JAN. 27, 1916.
1,222,682.
Patented Apr. 17, 1917.
2 SHEETS—SHEET 2.
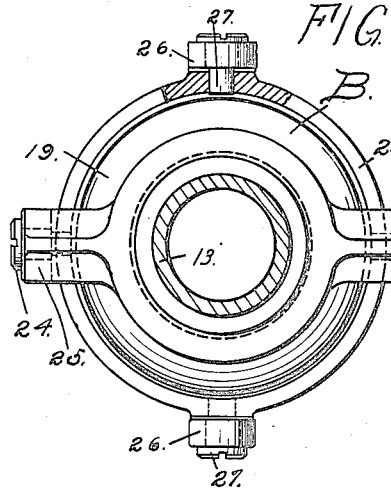
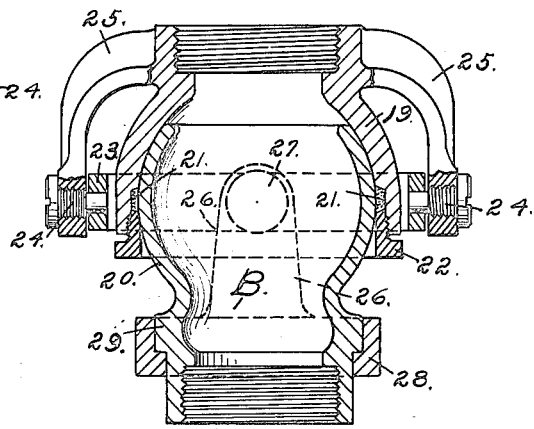
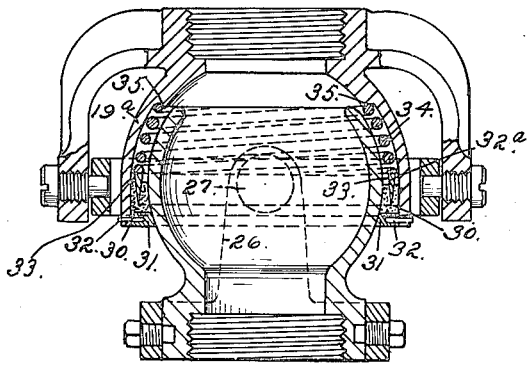
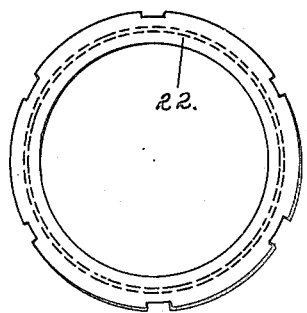
INVENTOR
Edward A. Schreiber
BY
Barnett & Truman
ATTORNEYS.

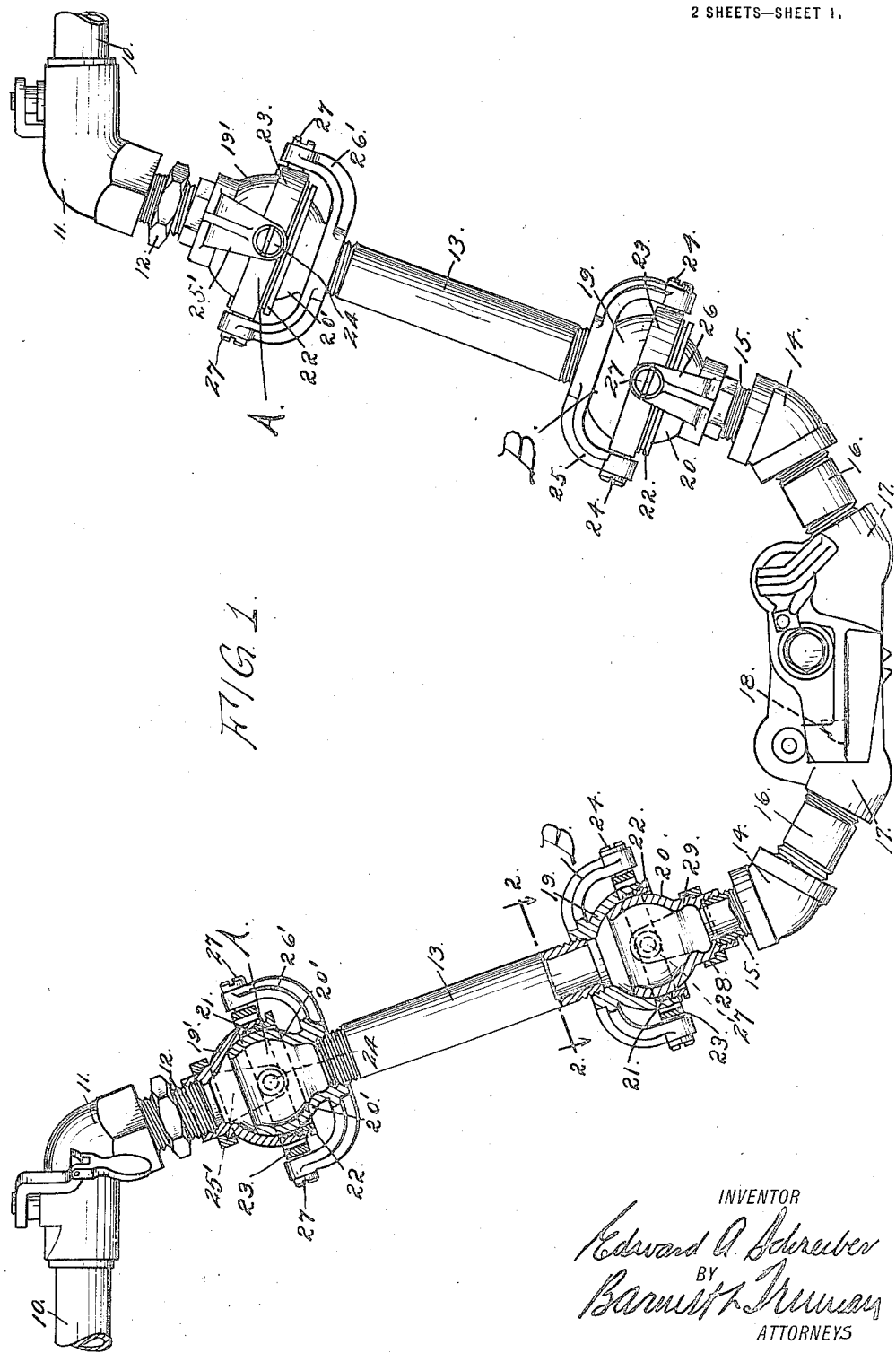

ns. # UNITED STATES PATENT OFFICE.

EDWARD A. SCHREIBER, OF CHICAGO, ILLINOIS, ASSIGNOR TO EGBERT H. GOLD, OF CHICAGO, ILLINOIS.

FLEXIBLE PIPE CONNECTION.

1,222,682.

Specification of Letters Patent.

Patented Apr. 17, 1917.

Application filed January 27, 1916. Serial No. 74,623.

*To all whom it may concern:*

Be it known that I, EDWARD A. SCHREIBER, a citizen of the United States, residing at Chicago, in the county of Cook and State of Illinois, have invented certain new and useful Improvements in Flexible Pipe Connections, of which the following is a specification.

My invention relates to a flexible pipe connection for use in connecting the sections of a railway train pipe.

It has been the practice for many years to connect the pipe sections forming the train pipe of a railway train by means of rubber hose. The life of these hose is short particularly where they are used on the steam line. Consequently they have to be renewed very frequently especially the hose at the forward end of the train which are subjected to maximum pressures. In order to avoid the expense and inconvenience incident to the use of rubber hose in this situation, efforts have been made to provide a train pipe connection composed of metal parts and a number of such devices have been designed and put into service, but none up to the making of the present invention have proven successful. The difficulty has been that a pipe connection when used in this situation must be capable of carrying relatively high pressures, say one hundred and twenty pounds, or more, and at the same time be extremely flexible so that it will readily accommodate itself to the relative movements of all sorts of the cars between which it is located; otherwise the connection will be strained or broken. It must also permit the engagement or disengagement of the coupler heads forming part of the connection even though one or both of the cars in question are not exactly in line or standing at the same level. Moreover, the connection must be so constructed that when coupled up with the corresponding device on the adjacent car it will form a loop extending under the air brake and signal couplings which will not be lengthened so as to come in contact with the road bed, or shortened so as to interfere with the air line connections.

The invention is illustrated, in certain preferred embodiments, in the accompanying drawings wherein—

Figure 1 shows, partly in elevation and partly in section, a flexible pipe connection suitable for use in connecting together the steam train pipes on railway cars.

Fig. 2 is a sectional view on line 2—2 of Fig. 1 with a part of the flexible joint shown on a lower plane.

Fig. 3 is a longitudinal sectional elevation of the joint shown in Fig. 2.

Fig. 4 is an inverted plan view of the packing nut, and

Fig. 5 is a view, similar to Fig. 3, showing a modification.

Like characters of reference designate like parts in the several figures of the drawings.

The complete pipe connection shown in Fig. 1 consists of two flexible connecting members, each attached to the train pipe and provided with a coupler for engagement with the coupler of the other flexible member. These members may be identical in construction. The left hand member will be described particularly and in the drawing the same reference numerals will be applied to corresponding parts of the other member.

10 is the train pipe, 11 the angle cock, 12 a union, A a flexible ball and socket joint with a gimbal joint support, B an identical joint but in a position reversed from that of joint A, 13 a rigid pipe section connecting joints A and B, 14 an elbow connected with joint B by a union 15, and 16 a union connecting elbow 14 with a coupler 17. This coupler is preferably a gravity or Sewall type coupler which interlocks with the mating coupler of the other flexible connecting member by means of cam lugs which are outlined in dotted lines at 18. As is well known in couplers of this type, the members are brought together and separated by a rocking movement in a substantially vertical plane and are held in engaged position by gravity, supplemented in some cases by locks of one sort or another.

The construction of joint B is as follows, reference being had particularly to Figs. 2 and 3: 19 is a socket member having a threaded engagement with pipe section 13. 20 is a hollow ball member having a threaded connection with union 15 and fitting within the socket member. The socket member is formed with a recess for packing 21. 22 is a nut threaded into the socket member for holding the packing in position to prevent the weight of the structure, and more particularly the pressure of the steam, from interfering with the flexibility of the joint. The ball member is supported on the other member by a structure which permits rocking movement of the ball and socket members in planes at right angles to each other, this structure consisting preferably of a gimbal joint which I will now describe. 23 is a ring mounted on trunnion studs 24 carried by yoke arms 25 formed on the socket member 19. The ball member 20 is also provided with a yoke comprising arms 26 standing at right angles to the arms 25 and provided with trunnion studs 27 which enter perforations in the ring 23. The arms 26, 26 are not, however, rigid with the ball member but have a swiveled connection therewith, the arms being formed on a ring 28 surrounding the neck 29 of the ball member and revoluble with respect thereto.

The construction and operation of joints A are substantially the same as that of joints B, with the exception that the arms 26'—26' are formed integral with the hollow ball member 20' and the arms 25'—25' are swiveled on the neck of the socket member 19'. In other respects these joints are constructed the same as joints B and the other elements thereof have been marked with the same reference characters referred to in connection with joints B.

By this arrangement one part of the joint is capable of partial axial rotation with respect to the other part. This is important in obtaining a proper relationship between the couplers 17 so as to insure an accurate coupling of one to the other. The gimbal joint movements of joints A and B give the pipe connection sufficient flexibility to permit the rocking movements of the coupler heads in coupling and uncoupling and to take care of most of the stresses to which the connection is subjected when the train goes around curves. Any slight inaccuracy, however, in the assemblage of the parts will be likely to throw the mating faces of the couplers out of parallelism with each other so as to make it impossible to couple them up or so as to produce a twisting stress on the couplers likely to produce a leak or break off the interlocking lugs. By giving one member of the joint a swiveled relation with respect to the other, this defect is entirely eliminated. Moreover, the connection is given additional flexibility as against the stresses to which it may be subjected in service, when the train rounds sharp or reversed curves, for example.

In Fig. 5 I have shown a construction of the joint which is modified with respect to the character of the packing. 30 is a packing which is held in place by a ring 31 secured by pins 32, for example, to the socket member $19^a$. $32^a$ is a follower ring arranged above the packing formed with a preferably wedge shaped flange 33 which cuts into the packing. A helical spring 34 intervenes between a shoulder 35 on the socket member and the follower ring. These arrangements provide a steam-tight joint which will remain steam tight for a considerable length of time without re-packing.

While I have described my invention in certain preferred embodiments, it will be understood that further modifications might be made without departure from the principle of the invention. Therefore I do not wish to be understood as limiting the invention to the exact constructions, arrangements and devices shown and described except so far as certain of the claims are so limited.

I claim:

1. The combination with a railway car and train-pipe section, of a flexible coupling element adapted to engage a corresponding element on another car to flexibly connect the train-pipe sections of said cars, comprising a ball and socket joint, a structure associated therewith to which the thrust of the fluid pressure on the ball and socket members is transmitted and which permits universal movement of said members within limits, and a swivel joint whereby one portion of said coupling element has axial movement with respect to the other.

2. The combination with a railway car and train-pipe section, of a flexible coupling element adapted to engage a corresponding element on another car to flexibly connect the train-pipe sections of said cars, comprising a coupler head of the gravity straight port type, a structure associated therewith to which the thrust of the fluid pressure on the ball and socket members is transmitted and which permits universal movement of said members within limits, and a swivel joint whereby one portion of said coupling element has axial movement with respect to the other.

3. The combination with a railway car and train-pipe section, of a flexible coupling element adapted to engage a corresponding element on another car to flexibly connect the train-pipe sections of said cars, comprising a ball and socket joint, a gimbal joint surrounding said ball and socket joint and connected therewith to take the thrust of the fluid pressure on said ball and socket members and permit universal movement thereof within limits, and a swivel joint whereby one portion of said coupling element has axial movement with respect to the other.

4. The combination with a railway car and train-pipe section, of a flexible coupling element adapted to engage a corresponding element on another car to flexibly connect the train-pipe sections of said cars, comprising a pair of ball and socket joints, a rigid connecting pipe between the same, a structure associated with each of said joints to which the thrust of the fluid pressure on the ball and socket members is transmitted and which permits universal movement of said members within limits, and a swivel joint whereby one portion of said coupling element has axial movement with respect to the other.

5. The combination with a railway car and train-pipe section, of a flexible coupling element adapted to engage a corresponding element on another car to flexibly connect the train-pipe sections of said cars, comprising a coupler head of the gravity, straight port type, a pair of ball and socket joints, a rigid connecting pipe between the same, a structure associated with each of said joints to which the thrust of the fluid pressure on the ball and socket members is transmitted and which permits universal movement of said members within limits, and a swivel joint whereby one portion of said coupling element has axial movement with respect to the other.

6. The combination with a railway car and train-pipe section, of a flexible coupling element adapted to engage a corresponding element on another car to flexibly connect the train-pipe sections of said cars, comprising a coupler-head of the gravity, straight port type, a pair of ball and socket joints, a rigid connecting pipe between the same, a pair of gimbal joints surrounding said ball and socket joints respectively and connected therewith to take the thrust of the fluid pressure on said ball and socket members and permit universal movement thereof within limits, and a swivel joint whereby one portion of said coupling element has axial movement with respect to the other.

7. The combination with a railway car and train-pipe section, of a flexible coupling element adapted to engage a corresponding element on another car to flexibly connect the train-pipe sections of said cars, comprising a pair of ball and socket joints, a rigid connecting pipe between the same, a pair of gimbal joints surrounding said ball and socket joints respectively and connected therewith to take the thrust of the fluid pressure on said ball and socket members and permit universal movement within limits, and a swivel joint whereby one portion of said coupling element has axial movement with respect to the other.

8. The combination with a railway car and train-pipe section, of a flexible coupling element adapted to engage a corresponding element on another car to flexibly connect the train-pipe sections of said cars, comprising a ball and socket joint, a ring surrounding said joint, pivots connecting one member of the joint to said ring, a yoke having a swiveled relation with the other member, and pivots connecting the ends of said yoke to the ring at points intermediate said first-named pivots.

9. The combination with a railway car and train-pipe section, of a flexible coupling element adapted to engage a corresponding element on another car to flexibly connect the train-pipe sections of said cars, comprising a pair of ball and socket joints, a connecting pipe between the same, and structures associated with said joints respectively consisting, in each case, of a ring, pivots connecting one member of the joint to the ring, a yoke having a swiveled relation with the other member of the joint, and pivots connecting the ends of the yoke to the ring at points intermediate the first-named pivots.

10. The combination with a railway car and train-pipe section, of a flexible coupling element adapted to engage a corresponding element on another car to flexibly connect the train-pipe sections of said cars, comprising a pair of ball and socket joints, a connecting pipe between the same, structures associated with said joints respectively consisting, in each case, of a ring, pivots connecting one member of the joint to the ring, a yoke having a swiveled relation with the other member of the joint, and pivots connecting the ends of the yoke to the ring at points intermediate the first-named pivots, and a coupler of the gravity straight port type connected with one of said ball and socket joints.

11. The combination with a railway car and train-pipe section, of a flexible connecting element for connecting said train-pipe section with a corresponding pipe on another car comprising a nipple for attachment to said train-pipe section, a coupler head for engagement with a coupler head on the other car, a rigid tubular member, gimbal joints interposed between the ends of said tubular member and said nipple and coupler head respectively, flexible, metallic means arranged within said gimbal joints for providing fluid-tight connections between said nipple and tubular member and between the latter and the coupler head, and a swiveled joint whereby one portion of said flexible connecting element may have axial movement with respect to the other.

12. The combination with a railway car and train-pipe section, of a flexible connecting element for connecting said train-pipe section with a corresponding pipe on another car comprising a nipple for attachment to said train-pipe section, a coupler head for engagement with a coupler head on the other car, a rigid tubular member, gimbal joints interposed between the ends of said tubular member and said nipple and coupler head respectively, and having swiveled engagement with one of the devices between which they are located, and flexible metallic means arranged within said gimbal joints for providing a fluid-tight connection between said nipple and tubular member and between the latter and the coupler head.

EDWARD A. SCHREIBER.